United States Patent [19]

Yeh

[11] Patent Number: 5,415,722
[45] Date of Patent: May 16, 1995

[54] AUTOMATIC MACHINE FOR CUTTING, FUSING, AND REELING RAW MATERIAL PLATES OF PLASTIC MATERIAL

[76] Inventor: Ten F. Yeh, No. 53, Alley 87, Lane 538, Sec. 4, An Ho Rd., Tainan, Taiwan, Prov. of China

[21] Appl. No.: 157,944
[22] Filed: Nov. 23, 1993
[51] Int. Cl.⁶ ............................................. B32B 31/00
[52] U.S. Cl. .................. 156/512; 156/304.6; 156/507; 156/558; 156/499
[58] Field of Search ............... 156/304.1, 304.2, 304.5, 156/304.6, 353, 499, 502, 507, 511, 512, 515, 518, 558

[56] References Cited

U.S. PATENT DOCUMENTS

| 3,935,056 | 1/1976 | Koyama et al. | 156/507 |
| 4,082,592 | 4/1978 | Raabe et al. | 156/502 X |
| 4,443,288 | 4/1984 | Sawada et al. | 156/304.6 |
| 4,496,407 | 1/1985 | Lowery, Sr. et al. | 156/353 X |
| 4,552,602 | 11/1985 | Landsness | 156/304.1 X |
| 4,743,412 | 5/1988 | Kuse | 156/304.1 X |
| 5,314,568 | 5/1994 | Ryan | 156/304.1 X |

FOREIGN PATENT DOCUMENTS 4034092  4/1992  Germany .......................... 156/304.1

Primary Examiner—David A. Simmons
Assistant Examiner—Paul M. Rivard
Attorney, Agent, or Firm—Poms, Smith, Lande & Rose

[57] ABSTRACT

A machine for processing raw material plates includes a feeding assembly, a first transportation assembly for moving raw material plates to a front clamping assembly which is used to clamp a first raw material plate for subsequent cutting of an irregular front end of the first raw material plate by a front electric heating assembly. The machine further includes a movable table device for moving the first raw material plate to a rear clamping assembly for subsequent cutting of an irregular rear end of the first raw material plate by a rear electric heating assembly. The rear electric heating assembly has a further function for fusing the cut front end of the first raw material plate to a previously fused material web before the cutting of the rear end of the fused material web. A second transportation assembly is provided to feed the first raw material plate to the rear electric heating assembly. The machine further includes a side cutting assembly for cutting the sides of the fused material web and a third transportation assembly for feeding the material web to a reel assembly.

1 Claim, 20 Drawing Sheets

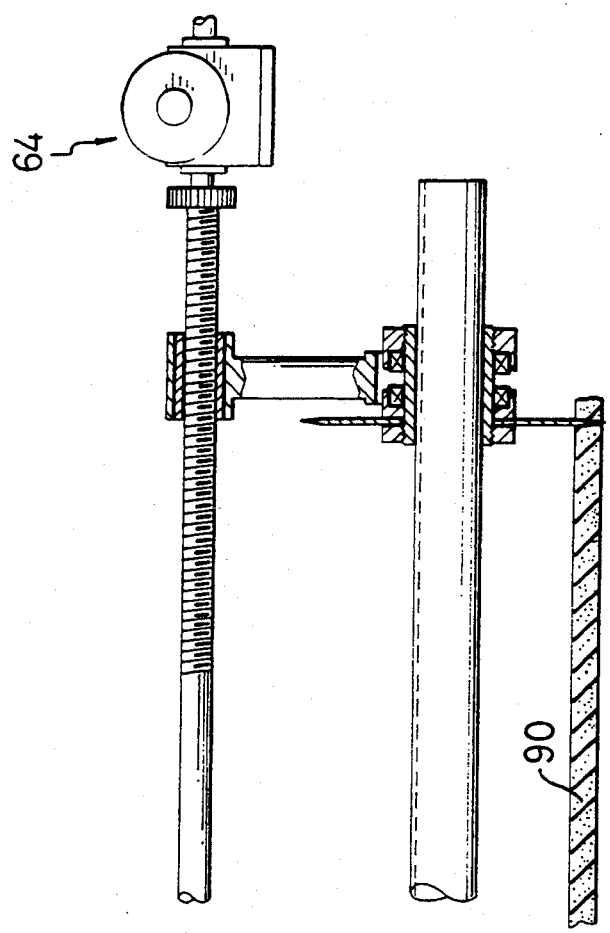
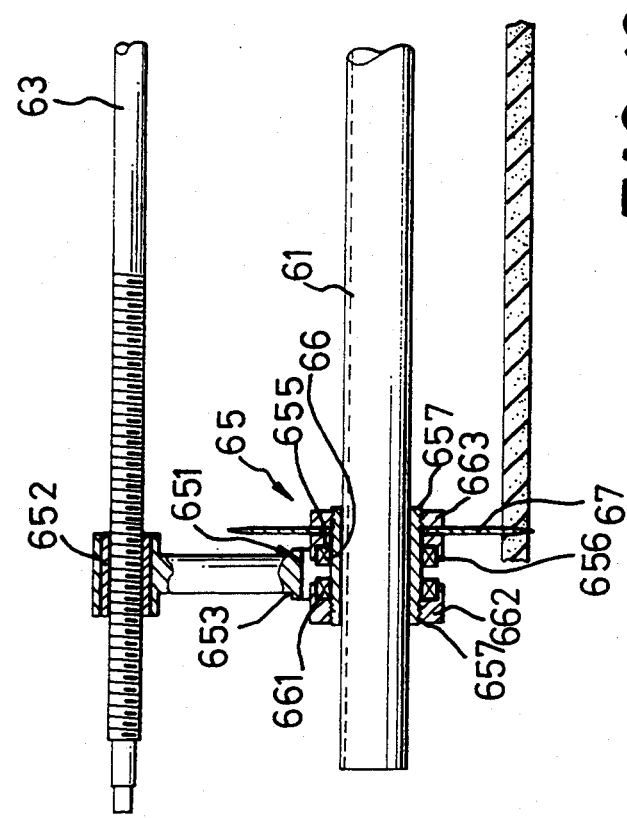
FIG. 13

AUTOMATIC MACHINE FOR CUTTING, FUSING, AND REELING RAW MATERIAL PLATES OF PLASTIC MATERIAL

BACKGROUND OF THE INVENTION

1. Field of the Invention

The present invention relates to an automatic machine for cutting, fusing, and reeling raw material plates of plastic material such as polyethyene (PE) or ethylene vinyl acetate (EVA).

2. Description of Related Art

Presently, for manufacturing shoe soles, plastic foam forms, by foam formation technique, rectangular thick raw material plates which are irregular in shape along their perimeters. The thick raw material plates are cut to have straight edges and are sliced into a number of thinner plates of a standard size under many cutting procedures. The thinner plates are glued or fused together at their ends thereof to form a web of material plate which is coiled around a reel for subsequent use in making the shoe soles.

In addition to a plurality of mechanisms, a considerable number of workers are required to move and stack the raw material plates and the reels. Furthermore, too many processing steps are involved and thus causes a waste in time and raw material and results in bad quality of products. Although machines have been proposed to handle the melting and reeling of the raw material plates, the raw material plates are still manually cut and workers are still required to move the raw material plates to the fusion machine. For environmental consideration, reclaimed material, achieved by adding stone powder, is also used to manufacture plastic plates which are harder and thus cannot be effectively rolled by the above-mentioned machines during the fusion thereof.

The present invention provides an automatic machine to solve the above-mentioned problems.

SUMMARY OF THE INVENTION

The present invention provides a machine for processing raw material plates of polyethyene (PE) or ethylene vinyl acetate (EVA). The machine includes a feeding assembly for feeding raw material plates, a first transportation assembly for moving raw material plates to a front clamping assembly which is used to clamp a first raw material plate for subsequent cutting of an irregular front end of the first raw material plate by a front electric heating assembly. The machine further includes a movable table means for moving the first raw material plate to a rear clamping assembly for subsequent cutting of an irregular rear end of the first raw material plate by a rear electric heating assembly. The rear electric heating assembly has a further function for fusing the cut front end of the first raw material plate to a previously fused material web before the cutting of the rear end of the fused material web. A second transportation assembly is provided to feed the first raw material plate to the rear electric heating assembly. The machine further includes a side cutting assembly for cutting the sides of the fused material web and a third transportation assembly for feeding the material web to a reel assembly.

Other objects, advantages, and novel features of the invention will become more apparent from the following detailed description when taken in conjunction with the accompanying drawings.

BRIEF DESCRIPTION OF THE DRAWINGS

FIG. 13 is a partially cross sectional schematic view of the side cutting assembly;

DESCRIPTION OF THE PREFERRED EMBODIMENT

Figure 1:
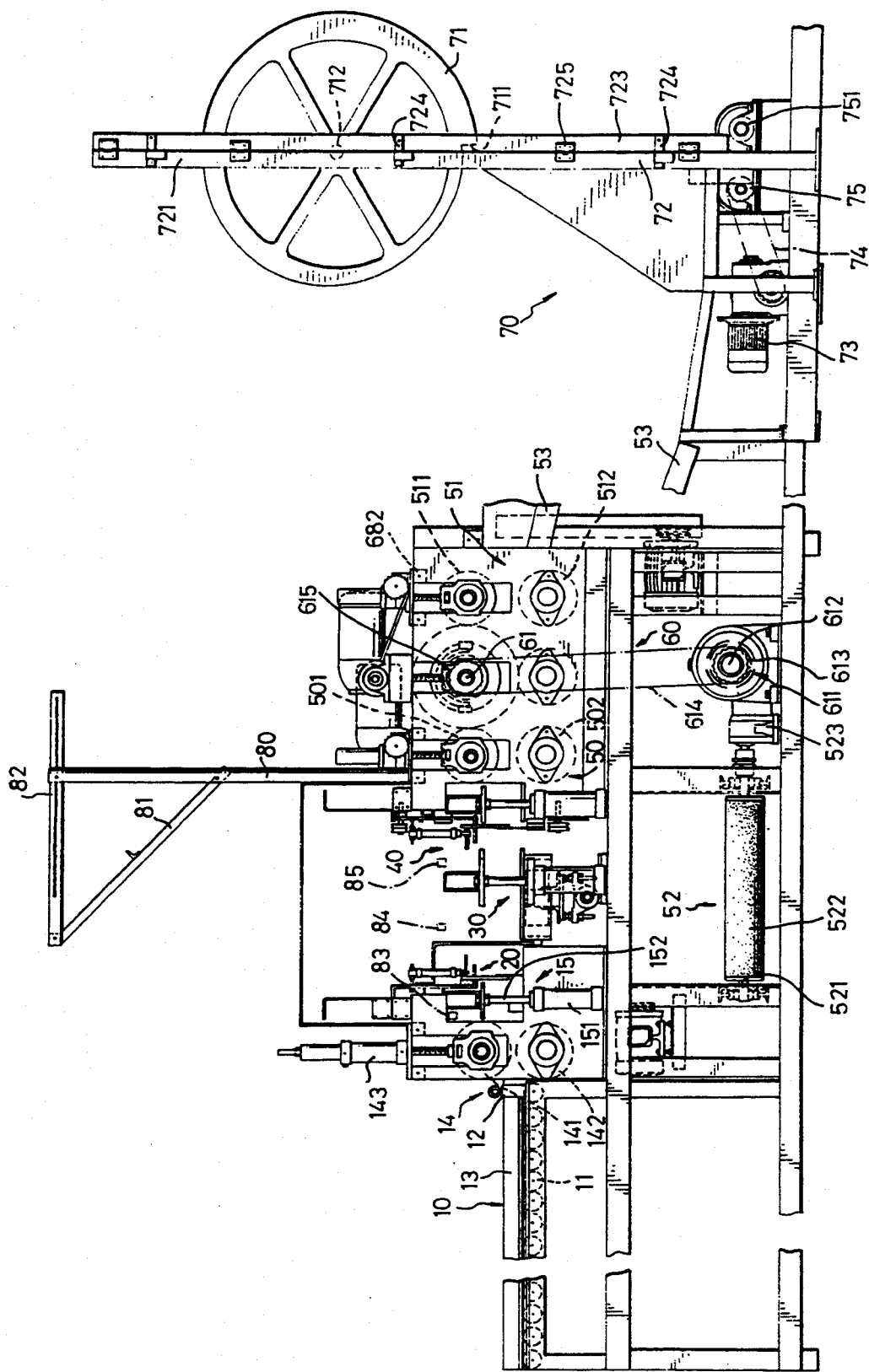
FIG. 1 is a side elevational view of an automatic cutting/fusion/reeling machine in accordance with the present invention.

Referring to the drawings and initially to FIG. 1, a machine for processing plastic material such as polyethyene (PE) or ethylene vinyl acetate (EVA) includes a feeding assembly 10, a first transportation assembly 14, a front clamping assembly 15, a front electric heating assembly 20 for cutting a front end of a new, incoming raw material plate, a movable table means 30, a rear clamping assembly 37, a rear electric heating assembly 40 for fusing a new, incoming raw material plate to a previously fused material web and cutting a rear end of the fused material web, a second transportation assembly 50, a side cutting assembly 60 for cutting the sides of the fused material web, a third transportation assembly 51, and a reel assembly 70 for reeling the fused material web.

The feeding assembly 10 includes a plurality of feeding rollers 11 which are freely rotatable and are mounted on a frame (not labeled). A positioning track 12 is mounted to each of two sides of the frame to guide the raw material plates (not shown in this figure) fed by the feeding rollers 11. A pair of positioning plates 13 are mounted on the frame and extend across the feeding rollers 11, a distance between the positioning plates 13 being adjustable so as to be equal to a width of the raw material plates to be fed to the front electric heating assembly 20 via the transportation of the first transportation assembly 14.

The first transportation assembly 14 includes an upper positioning wheel 141 and a lower rotational wheel 142. A pneumatic cylinder device 143 is provided to vertically carry the upper positioning wheel 141. The lower rotational wheel 142 is rotatable under the control of a motor or other suitable driving means.

The front clamping assembly 15 includes a fixed plate 154 (see FIG. 17) and a movable plate 153 which is attached to and thus vertically carried by a distal end of a piston rod 152 of each of two pneumatic cylinders 151 (only one is shown) mounted therebelow.

Figure 2:
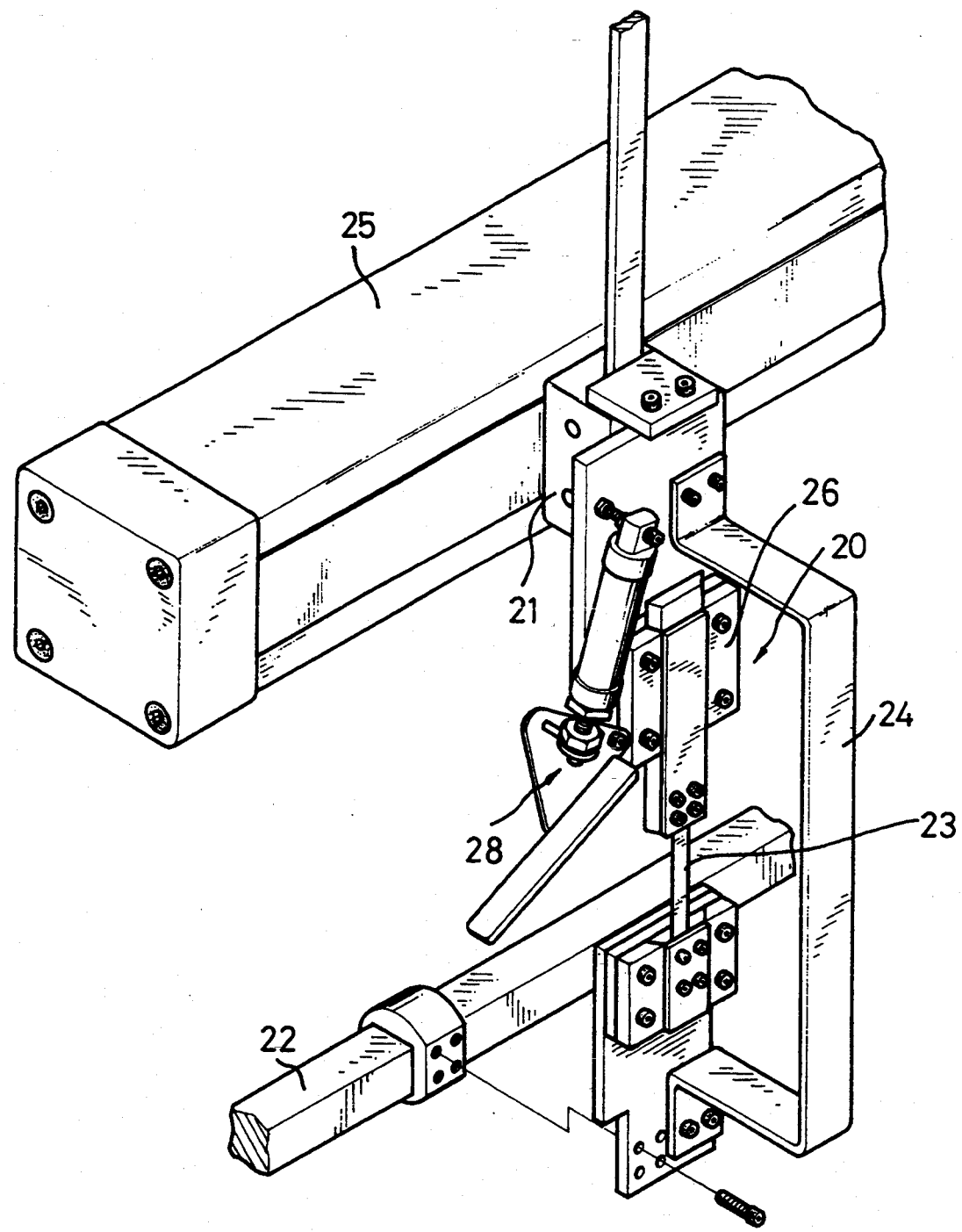
FIG. 2 is a perspective view illustrating the front electric heating assembly in accordance with the present invention.
Figure 7:
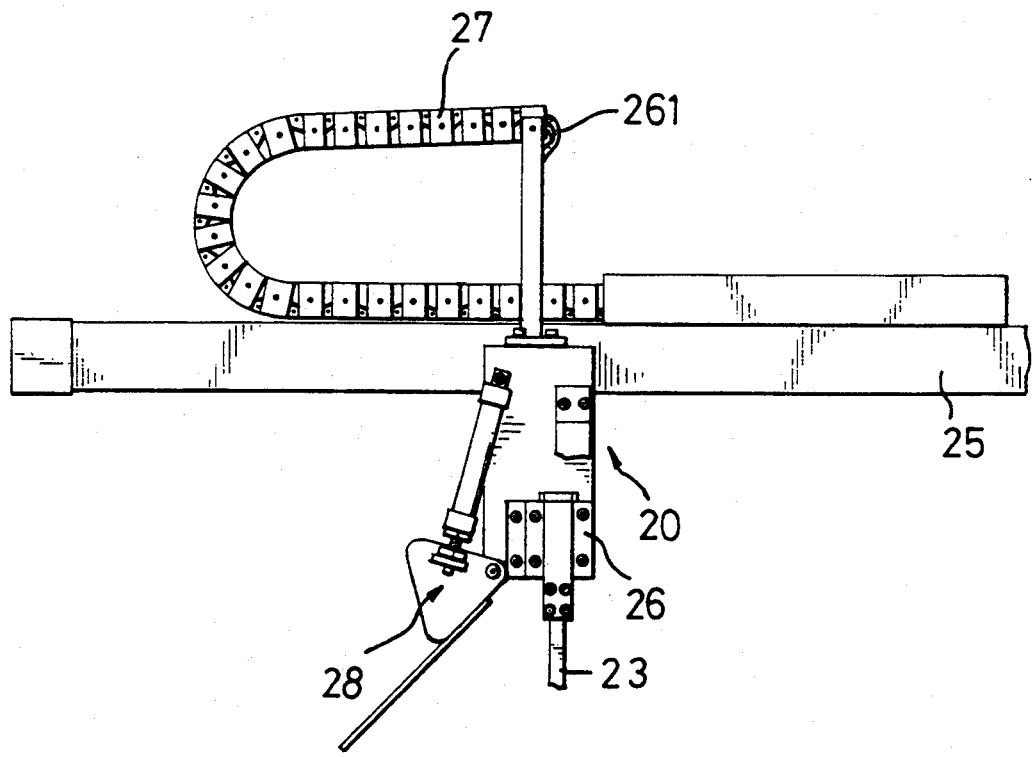
FIG. 7 is a side elevational view of the front electric heating assembly.

Still referring to FIG. 1 and further to FIG. 2, the front electric heating assembly 20 includes a mounting plate 21 which is carried by a pneumatic cylinder means 25 to move horizontally, a heating plate 26 mounted to the mounting plate 21 to supply heat energy to a heating blade 23 whose lower end is supported by a substantially slanted U-shaped bracket 24 which, in turn, is attached to the mount plate 21, thereby preventing the heating blade 23 from deflection or breakage due to softening resulting from overheating. Electricity is supplied by electric source wires 261 (see FIG. 7) which are mounted above the heating plate 26 and passes through a protective tubular chain 27, such that the wires 261 do not tangle during reciprocatable horizontal movement of the heating blade 23 which is guided by a track 22 mounted below the heating plate 26. A waste dispensing device 28 is mounted to the mounting plate 21 and is adjacent to the heating blade 23 to guide the waste plastic material to fall on a waste material conveyor means 52.

Figure 8:
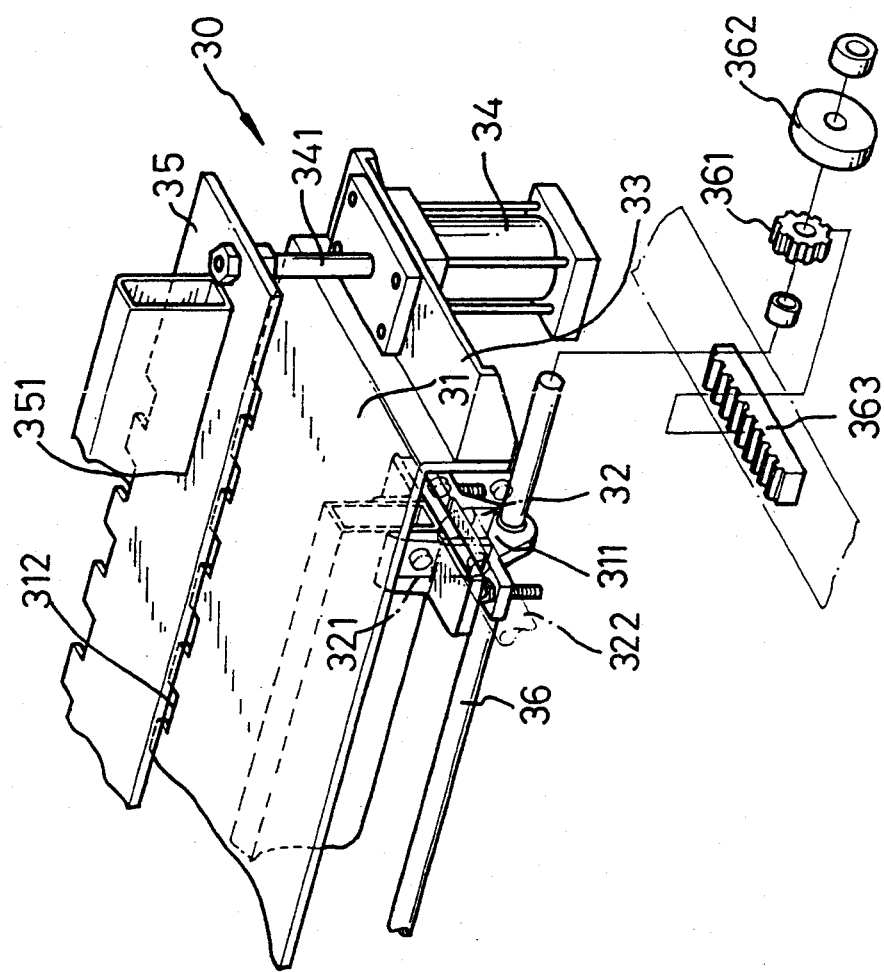
FIG. 8 is a perspective view illustrating the movable table means of the machine in accordance with the present invention.
Figure 9:
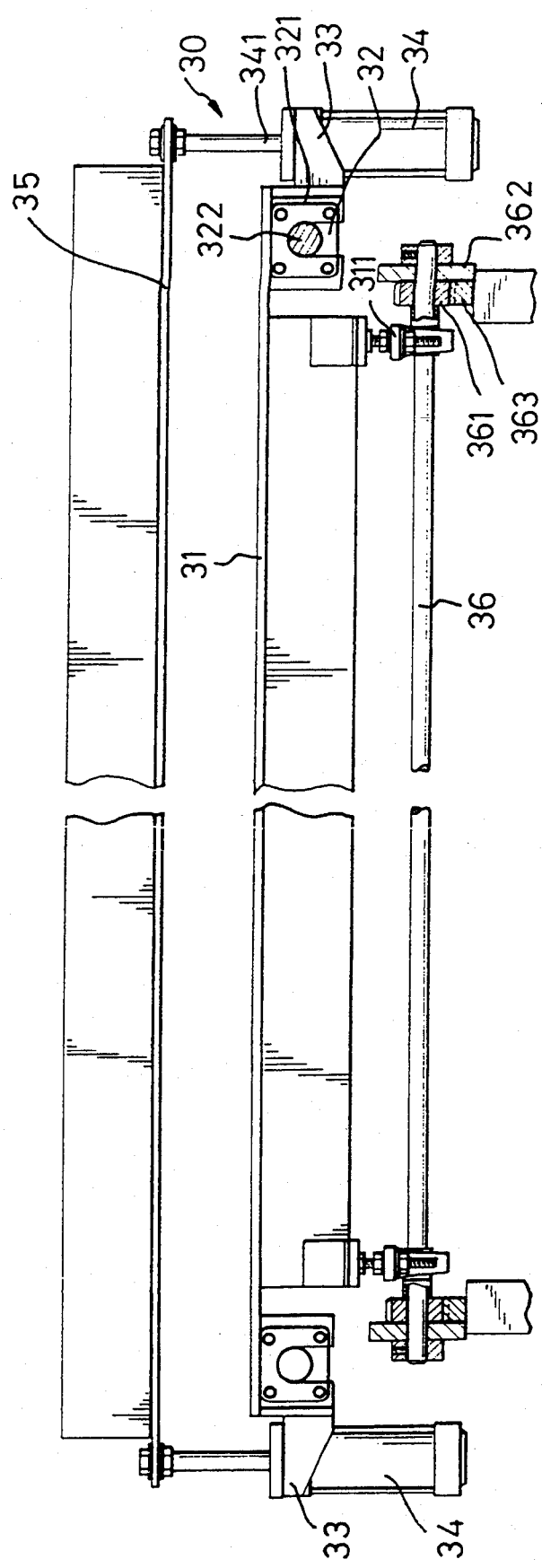
FIG. 9 is a side elevational view of the movable table means.

Referring to FIGS. 1, 8, and 9, the movable table means 30 includes a table 31 which is mounted to the bodies 321 of two pneumatic cylinders 32 (only one is shown) and thus carriable by the latter to move horizontally. A mounting plate 33 is mounted to each of front and rear ends of the table 31 for mounting a vertical pneumatic cylinder 34. The piston rods 341 of the cylinders 34 together carry a clamping plate 35 vertically. Piston rods 321 of cylinders 32 carry the table 31, the vertical cylinders 34 as well as the clamping plate 35 to move horizontally, while the vertical cylinders 34 carry the clamping plate 35 to move vertically.

A pair of axles 36, which extend in a direction parallel to the longitudinal axis of the table 31, are secured below the table 31 by two positioning bars 311. A gear 361 and a positioning wheel 362 are mounted on each of two ends of each axle 36, in which the positioning wheel 362 rests on the frame of the machine and the gear 361 meshes with a rack 363. By such an arrangement, displacements of the two sides of the movable table 30 are synchronous to each other to ensure perfect fusion between two raw material plates. One edge of the clamping plate 35 has castellations 351 therein and the table 31 has castellations 312 in an associated edge.

Figure 3:
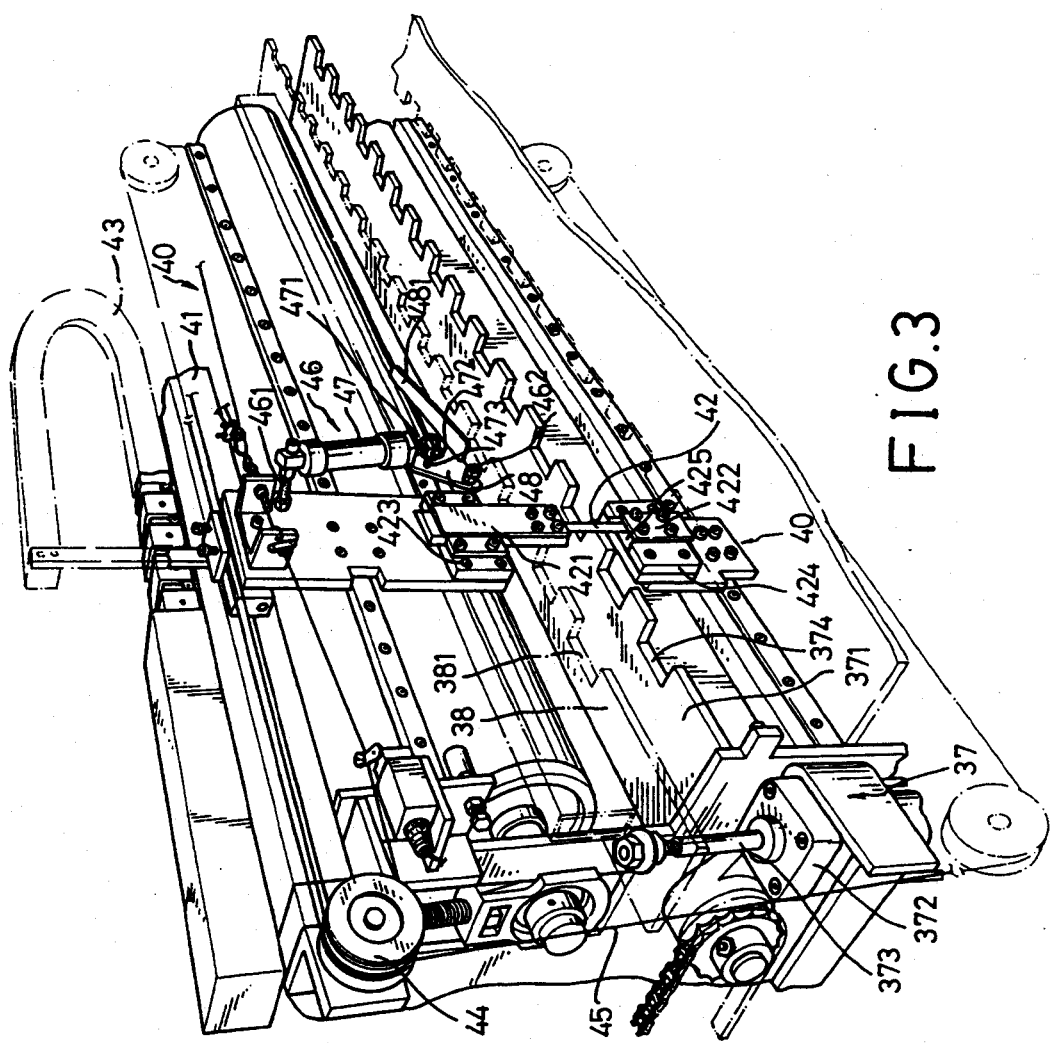
FIG. 3 is a partial perspective view illustrating the rear electric heating assembly of the machine in accordance with the present invention.

Referring now to FIG. 3, the rear clamping assembly 37 is mounted after the movable table means 30 and includes a fixed plate 371 and a movable plate 38 which is attached to and thus vertically carried by a piston rod 373 of each of two vertical pneumatic cylinders 372 (only one is shown). The fixed plate 371 and the movable plate 38 also have castellations 374 and 381 in associated edges thereof for fittingly mating with the castellations in the table 31 and the clamping plate 35.

Figure 6:
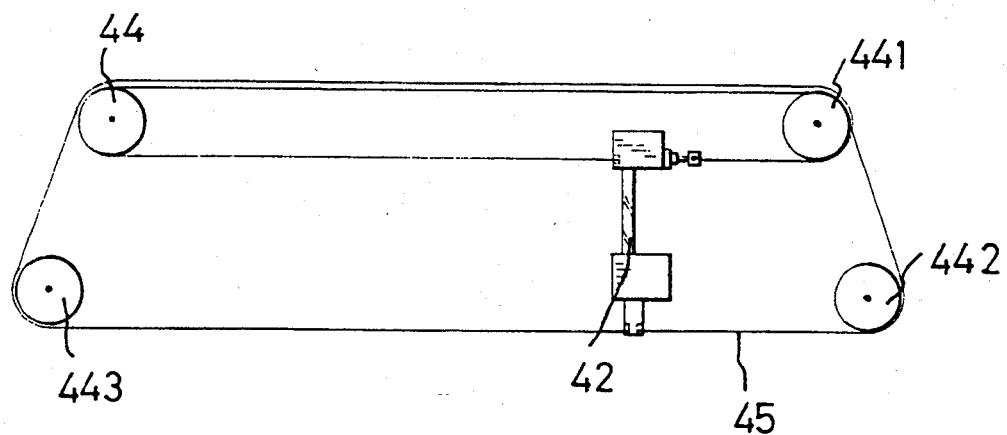
FIG. 6 is a schematic view illustrating the arrangement of the rollers of the rear electric heating assembly.

Still referring to FIG. 3, the rear electric heating assembly 40 has a structure slightly different to that of the front electric heating assembly 20. The rear electric heating assembly 40 also includes a heating blade 41 which is horizontally carried by a pneumatic cylinder means 42. The electricity is supplied by electric source wires to a heating plate (not labeled), the electric source wires passing through a protective tubular chain 43 (see FIG. 3), such that the wires does not tangle during reciprocatable horizontal movement of the heating blade 42. The horizontal movement of the heating blade 42 is guided by a loop 45 which is mounted around four pulleys 44, 441, 442, and 443 respectively mounted to four corners thereof. As can be seen in FIG. 6, the loop 45 starts from pulley 442, passes over pulley 443, tangles around pulleys 44 and 441 twice, and returns to pulley 442. A lower end of the heating blade 42 is attached to the loop 45 at the section between pulleys 442 and 443, while an upper end of the heating blade 42 is attached to the loop 45 at the second tangling section between pulleys 44 and 441. By such an arrangement, the upper and lower ends of the heating blade 42 may move synchronously and horizontally under operation of the pneumatic cylinder means 41.

The front and rear electric heating blades 23 and 42 are vertically adjustable. Taking the rear electric heating 18 blade 42 for example, referring to FIGS. 3 and 4, it is securely held between upper and lower plates 421 and 422 in which the upper plate 421 is securely attached to an upper positioning seat 423, while the lower plate 422 includes a dovetail arrangement to cooperate with a vertical dovetail groove 425 in a lower positioning seat 424, the lower plate 422 thus being vertically slidable relative to the lower positioning seat 424. The upper and lower plates 421 and 422 and upper and lower positioning seats 423 and 424 are made of heat conducting material, such as copper, and are interconnected by heat conducting wires. When the heating blade 42 expands along its lengthwise direction, i.e., in the vertical direction, the lower plate 422 is moved downwardly to avoid deformation of the heating blade 42, and thus enhance the quality of the cut and fused material plates. Furthermore, if the width of the material plates changes, the heating blade 42 may be replaced by a wider one. The front heating blade 23 is also vertically adjustable under same arrangement and is not redundantly described herein.

Figure 4:
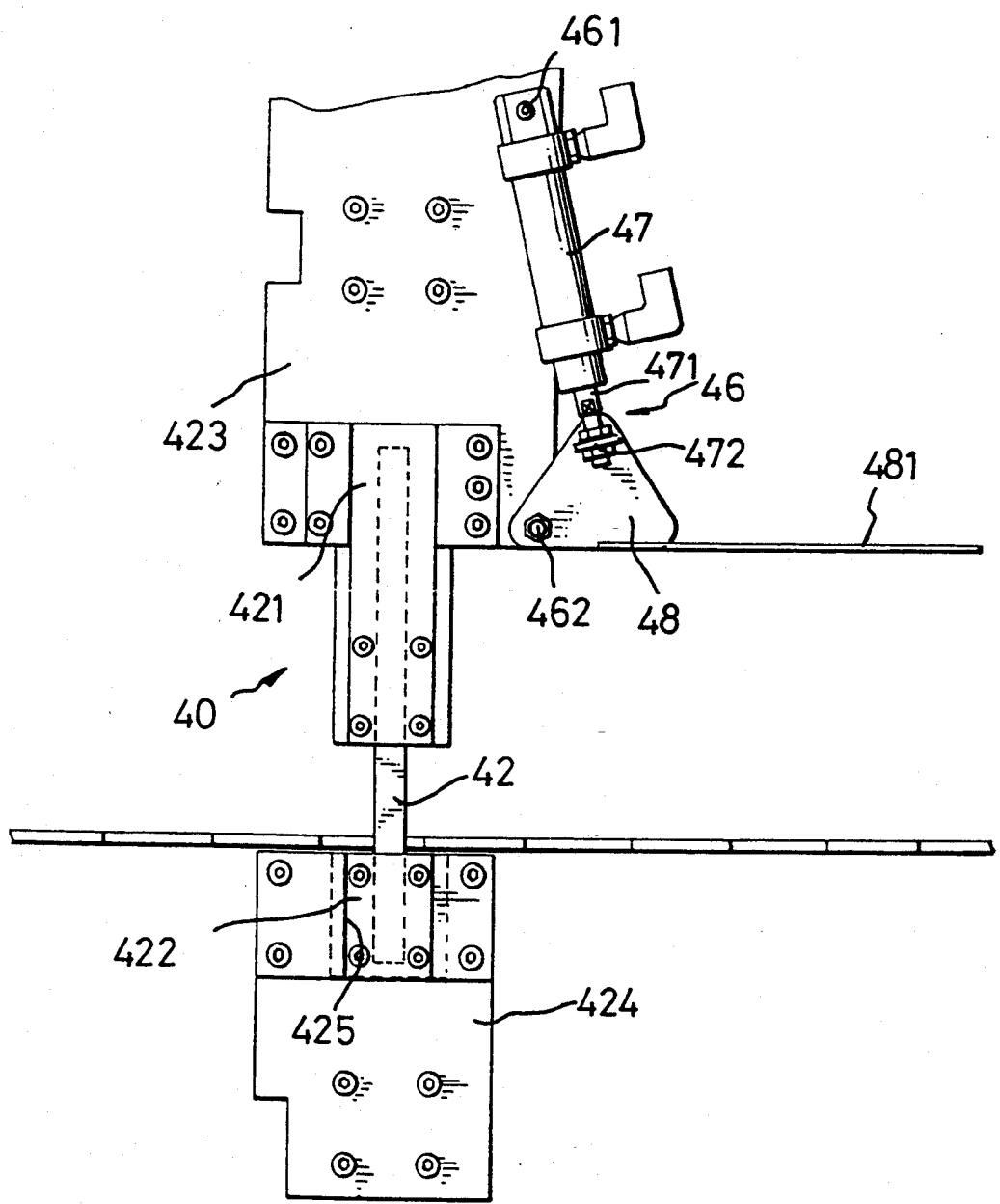
FIG. 4 is a side elevational view illustrating the rear electric heating assembly.
Figure 5:
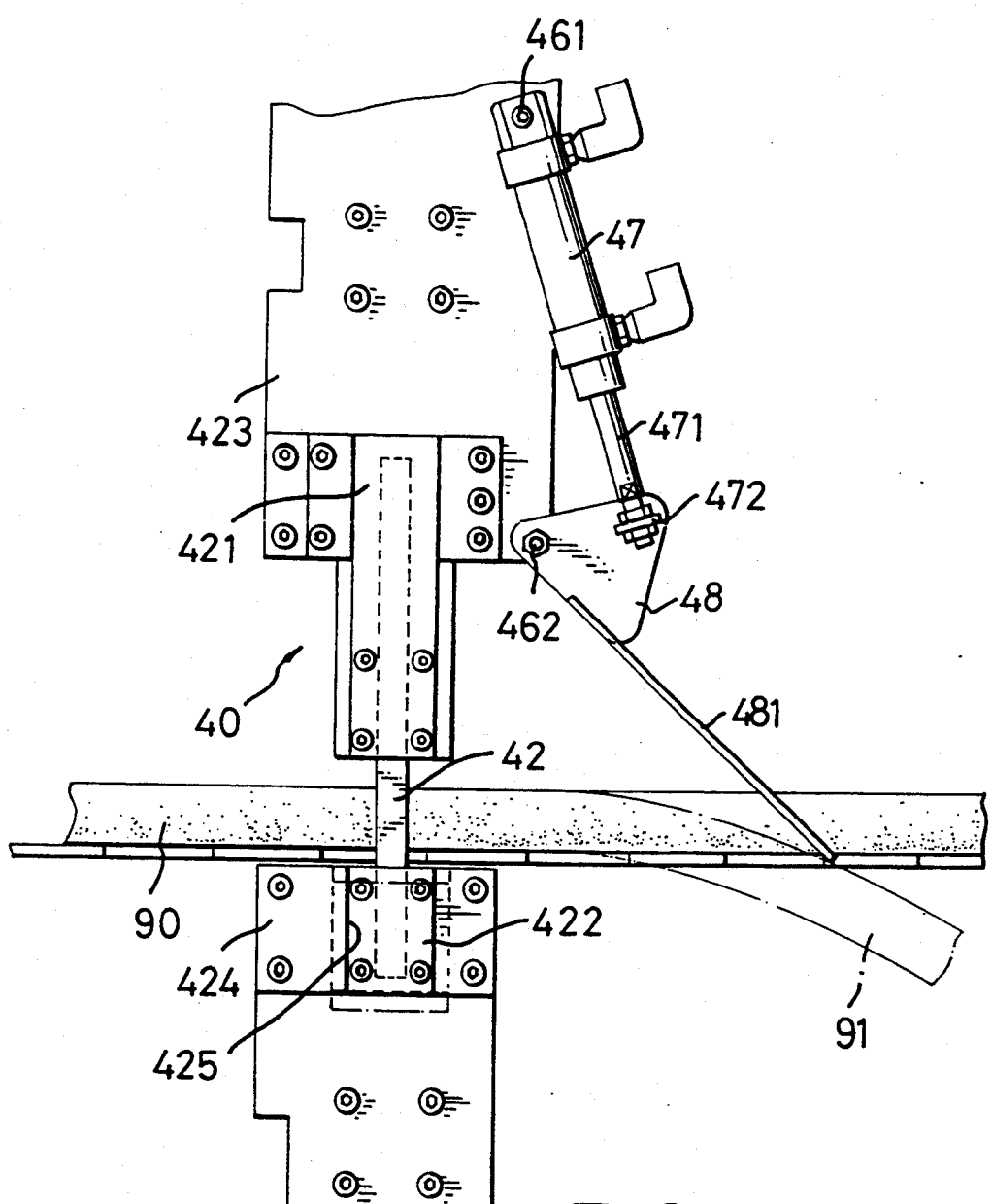
FIG. 5 is a side elevational view illustrating operation of the rear electric heating assembly.

Referring to FIGS. 3 through 5, a waste material dispensing device is provided adjacent to the rear heating assembly 40 and includes a pneumatic cylinder 47 whose upper end is pivoted to an upper section of the upper positioning seat 423 by a pivotal axle 461. A triangular plate 48 is pivoted at one of its corners to a lower section of the upper positioning seat 423 by a second pivotal axle 462. A second corner of the plate 48 is connected to a distal end of a piston rod 471 of cylinder 47 by a pivotal seat 472. An operative member 481 extends along one side of the triangular plate 48. The same arrangement of waste material dispensing device (28) is provided to the front electric heating assembly 20. [see FIG. 2].

Figure 10:
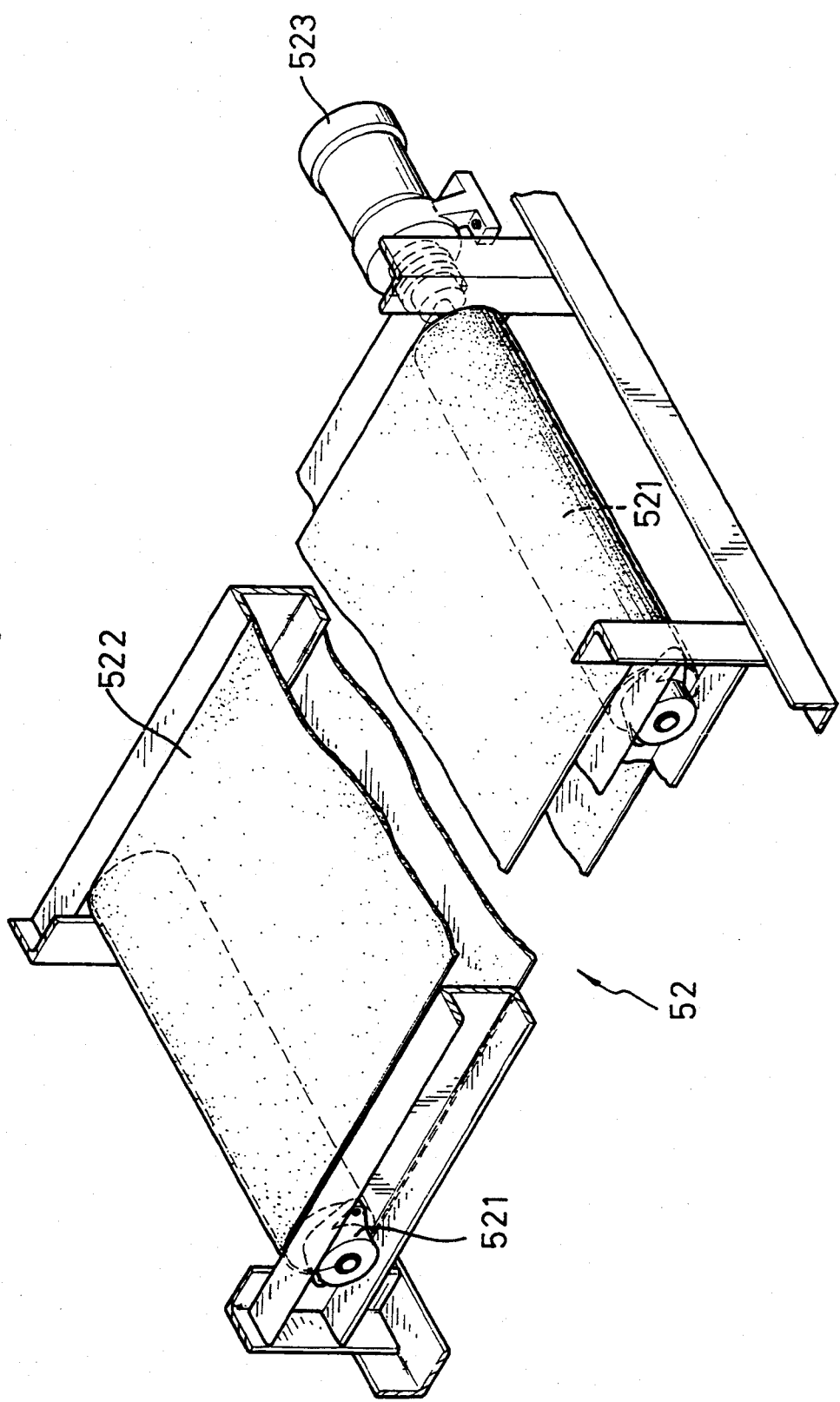
FIG. 10 is a conveyor device for waste material of the machine in accordance with the present invention.

Referring to FIGS. 1 and 4, when the front heating blade 23 has finished cutting a front end of the material plate and is about to return to its original position, or the rear heating blade 42 is under fusing procedure, the operative member 481 of the waste material dispensing device is in a substantially horizontal position, as shown in FIG. 4. When the rear heating blade 42 has finished cutting the rear end of fused material plate 90, the piston rod 471 moves downwardly to urge the triangular plate 48 to pivot through a certain degree such that the operative member 481 exerts a downward force on waste material 91 [see FIG. 5] which accordingly falls on a waste conveyor means 52. Similar operation is made after the front heating blade 23 has cut the front end of the incoming raw material plate 90. Referring to FIGS. 1 and 10, the waste conveyor means 52 includes a belt 522 mounted around two transverse rollers 521 one of which is driven by a motor 523.

Referring back to FIG. 1, the second transportation assembly 50 includes an upper positioning wheel 501 and a lower rotational wheel 502. An adjusting screw device (not labeled) is provided to an upper section of the upper positioning wheel 501 for adjusting the height of the latter, while the lower rotational wheel 502 is driven by a motor or other suitable driving means. The third transportation assembly 51 also includes an upper positioning wheel 511 and a lower rotational wheel 512. An adjusting screw device (not labeled) is provided to upper section of the upper positioning wheel 511 for adjusting the height of the latter, while the lower rotational wheel 512 is driven by a motor or other suitable driving means.

Referring to FIGS. 1 and 11 through 13, the side cutting assembly 60 includes upper and lower guiding axles 61 and 62. An adjusting screw 63 is provided above the upper guiding axle 61 and includes two screw sections respectively at two ends thereof, one of the screw sections being right-handed and the other being left-handed. A driving means, such as a motor 64 is provided to drive the adjusting screw 63. A pair of tools or cutter subassemblies 65 are mounted on the upper guiding axle 61. Each cutter subassembly 65 includes a positioning seat 651 which has a sleeve 652 which has inner threading and is freely and rotatably mounted to an upper end thereof for receiving the screw section of the adjusting screw 63 and a substantially arc-shaped member 653 at a lower end thereof. The cutter subassembly 65 further includes a main sleeve 655 with a positioning ring 656 which is mounted around a mediate section of a periphery thereof and which has two threaded ends 657. Referring to FIG. 13, a thrust bearing 66 is mounted into the positioning ring 656 and a circular cutter 67 mounted to the right side of the positioning ring 656 is retained by a nut 663 engaged on the threaded end 657. Then, the arc-shaped member 653 is mounted around the main sleeve 655 and is retained by two pins 658 passing through pin holes 654 [see FIG. 12] formed therein and frictionally engage with the outer periphery of the main sleeve 655, thereby holding the thrust bearing 66 in one side of the arc-shaped member 653. A second thrust bearing 661 is mounted into the other side of the arc-shaped member 653 and is retained by another nut 662.

Figure 11:
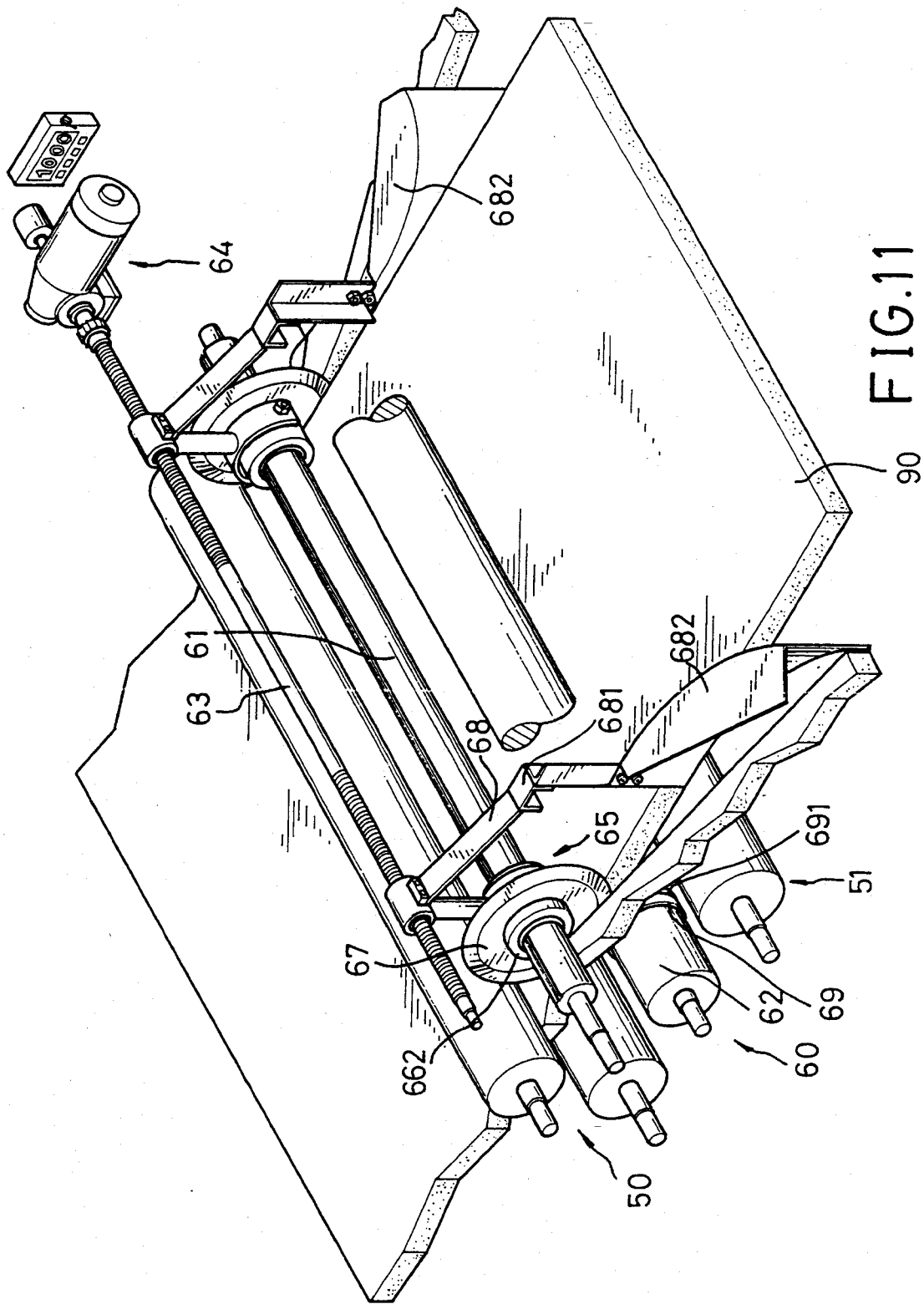
FIG. 11 is a perspective view of a side cutting assembly of the machine in accordance with the present invention.
Figure 12:
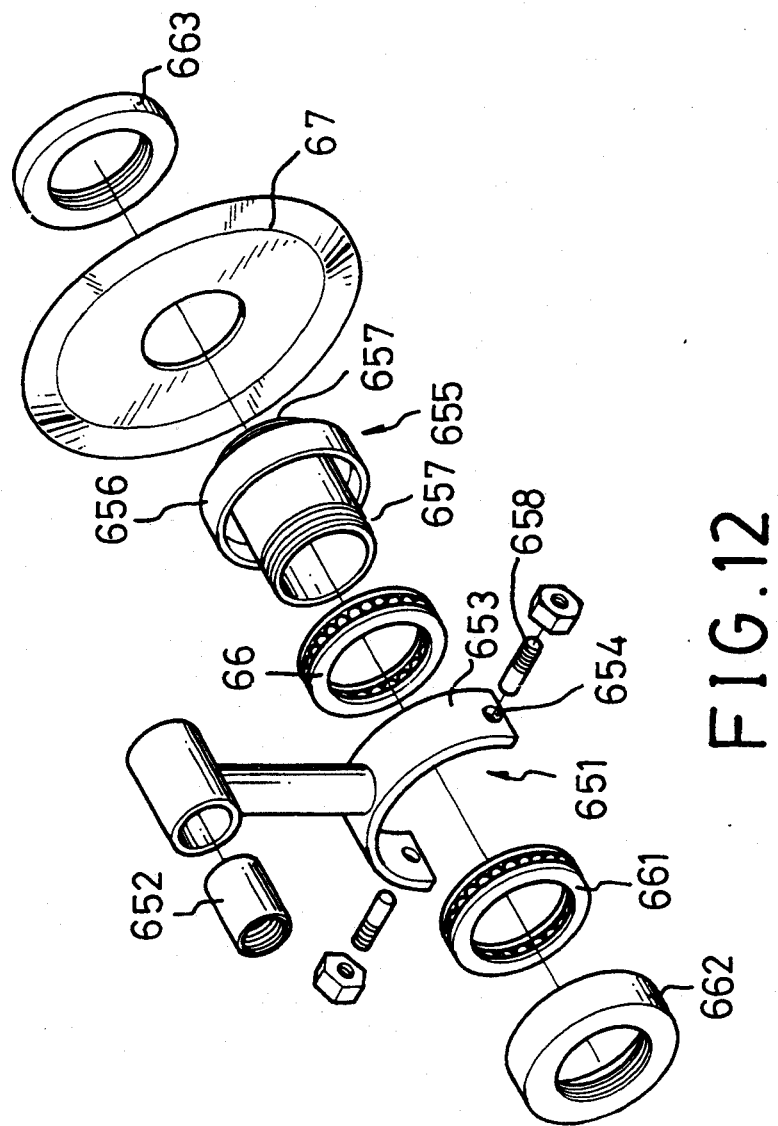
FIG. 12 is an exploded view of the cutter subassembly of the side cutting assembly in FIG. 11.

Referring to FIG. 11, a positioning bracket 68 extends from the upper end of each positioning seat 651 and includes a substantially inverted U-shaped member 681 to which an arc-shaped waste material guiding member 682 is securely attached for guiding waste material. A pair of anvil wheels 69 are mounted around the lower guiding axle 62 and each of which has an annular groove 691 for receiving the edge of the cutter 67. Referring to FIG. 1, a transmission device 611 is provided to drive the upper guiding axle 61 as well as the cutters 67 for cutting the material plate 90 and includes a motor 612 with an output gear 613 which drives a gear 615 mounted on the upper axle 61 via a chain 614.

Figure 14:
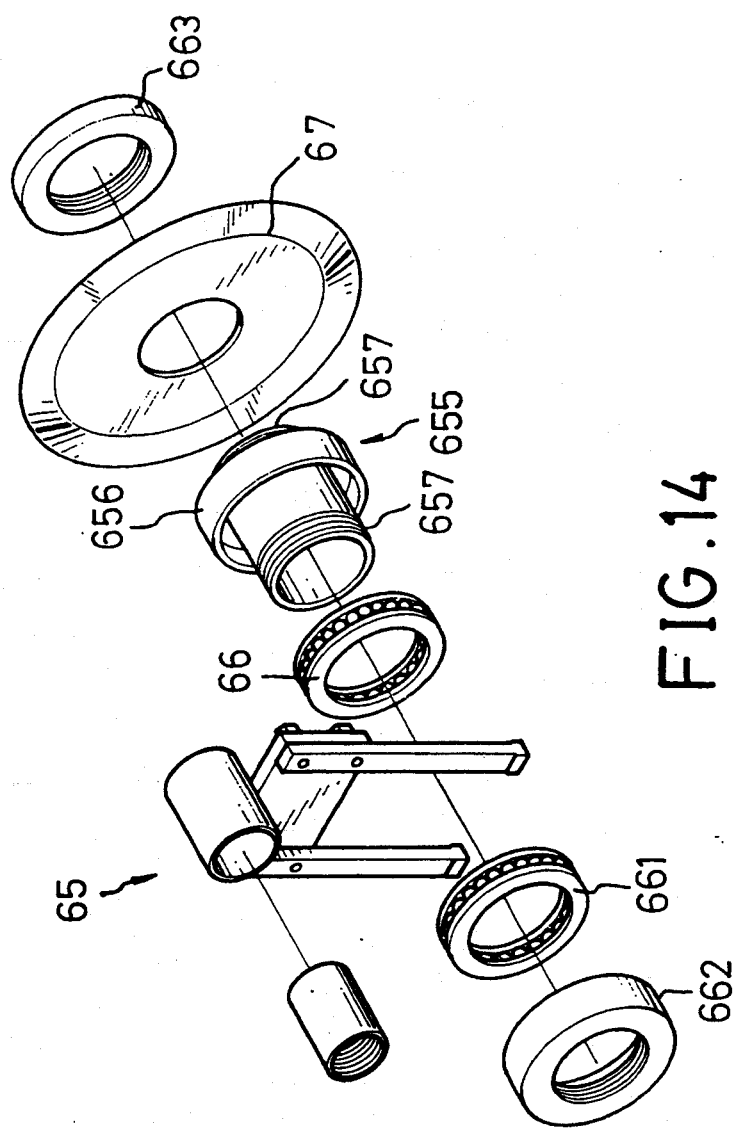
FIG. 14 is another embodiment of the cutter subassembly of the side cutting assembly.

Referring to FIG. 13, when adjusting the distance between the cutters 67, the motor 64 rotates the adjusting screw 63 to cause the cutters 67 (together with the anvil wheels 69) to move toward or away from each other under the provision of the different screw directions in the adjusting screw 63 and the provision of the freely rotational sleeve 652 of the positioning seat 651. Provision of the thrust bearings 66 and 661 allows the adjustment to be proceeded during rapid rotation of the cutters 67. FIG. 14 shows another embodiment of the positioning seat which is a substantially inverted U-shaped member for mounting the cutter 67. The occupied space of the machine is reduced since the side cutting assembly 60 is directly mounted between the second and third transportation assemblies.

Figure 15:
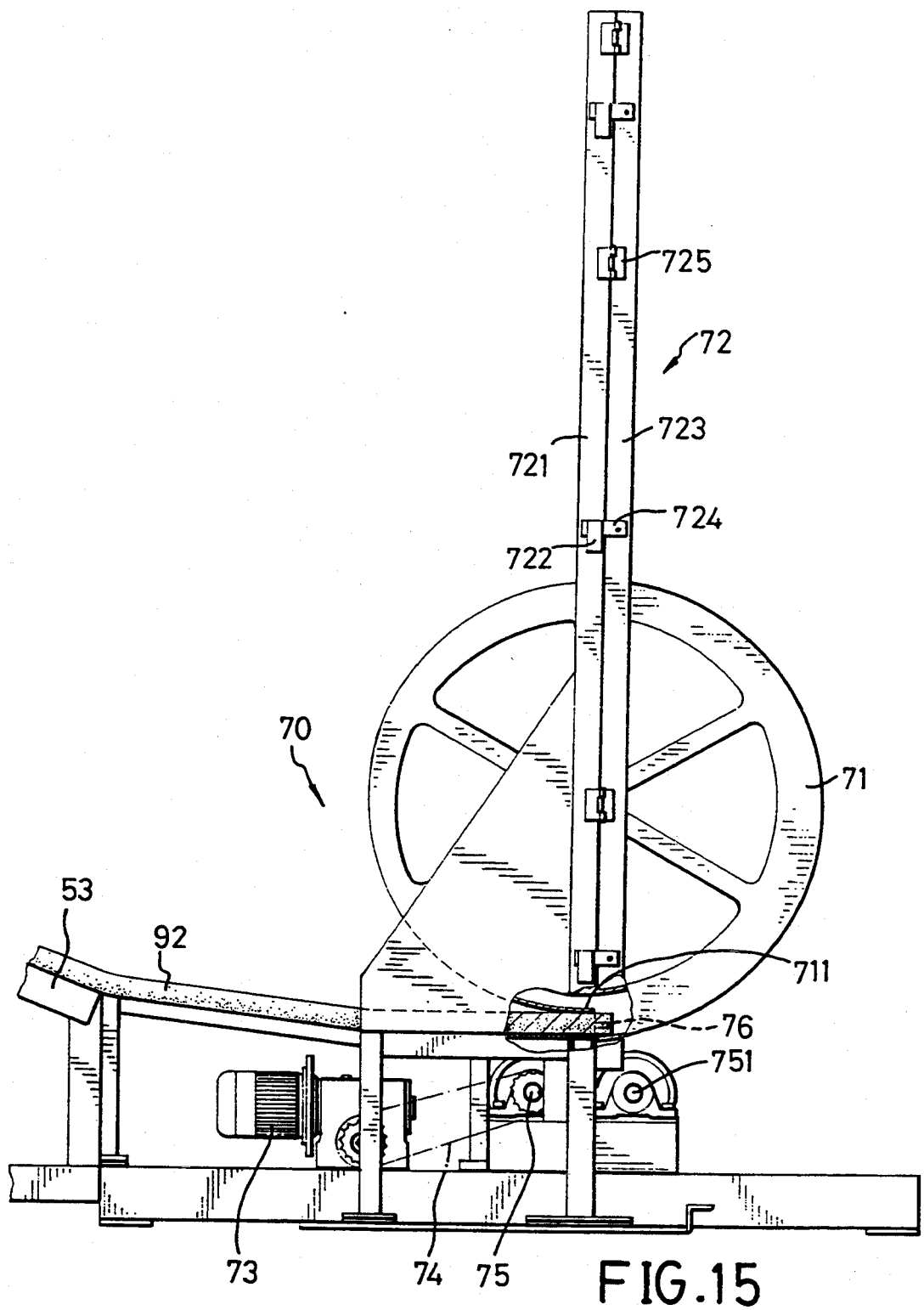
FIG. 15 is a side elevational view of a reel assembly of the machine in accordance with the present invention.

Referring to FIGS. 1 and 15, mounted behind a rear end of the third transportation assembly 51 is an inclined plate 53 behind which the reel assembly 70 is mounted. The reel assembly 70 includes an axle 712 mounted between a pair of spaced vertical beams 72 (only one is shown) and a reel 71 rotatably mounted on the axle 712. The reel 71 is substantially cylindrical and has a rim formed in each of two ends thereof. Each beam 72 includes two beam members 721 and 723 which are connected by hinges 725. Beam member 721 has a plurality of spaced brackets 722, while beam member 723 has corresponding latches 724 pivoted thereto. When the latches 724 are in unlocked positions, beam member 723 may be rotated through 90° [for removal of the reel 71]. Furthermore front and rear wheels 75 and 751 are mounted below the reel 71 and are driven by a motor 73 and a chain 74. A hook means 76 extends from a lower end of each vertical beam 72 for engaging with an associated cutout 711 in the reel 71 when the reel 71 is in its lowermost position, such that the cutout 711 faces the machine.

Figure 16:
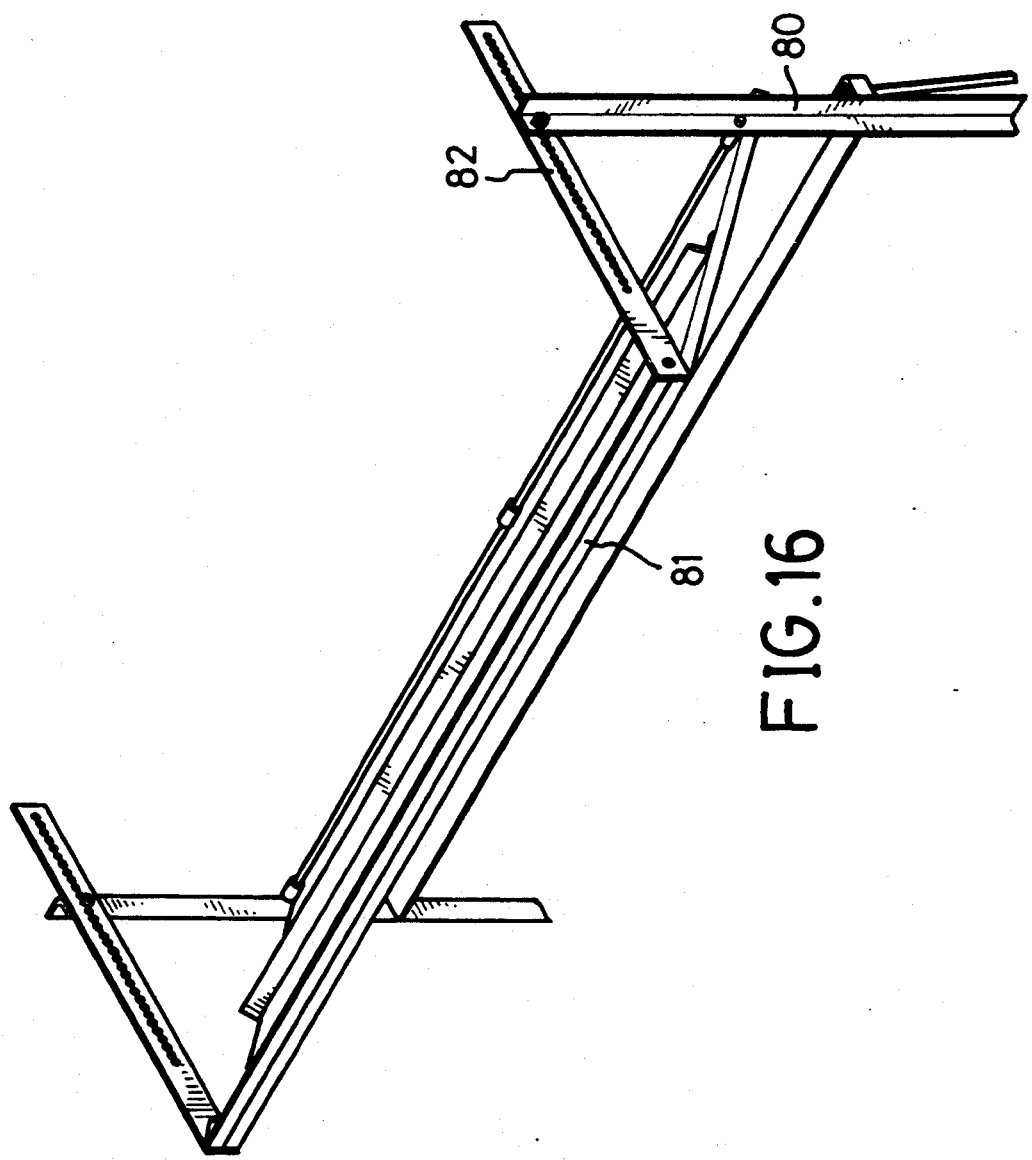
FIG. 16 is a mirror arrangement on a frame of the machine in accordance with the present invention.

Referring to FIGS. 1 and 16, a mounting frame 80 is provided above the space between the front and rear clamping assemblies 15 and 37 for mounting an inclined mirror 81 whose inclination can be adjusted by an adjusting plate 82 for reflecting the status of cutting and fusing. Thus, the worker needs not to patrol back and forth between the movable table means 30 and the feeding table.

The machine in accordance with the present invention is controlled by a control box and electric eyes are installed at proper locations to detect whether trouble occurs or not. Referring to FIG. 1, electric eye 83 detects the distance travelled by the front end of the raw material plate relative to the front clamping assembly 15 in order to stop the lower rotational wheel 142 and causes the front clamping assembly 15 to clamp the raw material plate for proceeding with the cutting of the front end of the raw material plate. Electric eye 84 detects the past distance of the front end of the raw material plate relative to the movable table means 30 in order to urge cylinder 34 to carry the clamping plate 35 downwardly to clamp the front end of the raw material plate and to urge the upper positioning wheel 141 to move upwardly. Electric eye 85 detects the past distance of the rear end of the raw material plate in order to stop the lower rotational wheels 502 and 512 and to urge the movable plate 38 of the rear clamping assembly 37 to move downwardly to clamp the rear end of the raw material plate for subsequent cutting of said rear end. Motors, sprockets, chains, and detectors are provided to control the length of the raw material plate, thereby providing an automatic machine.

Figure 17:
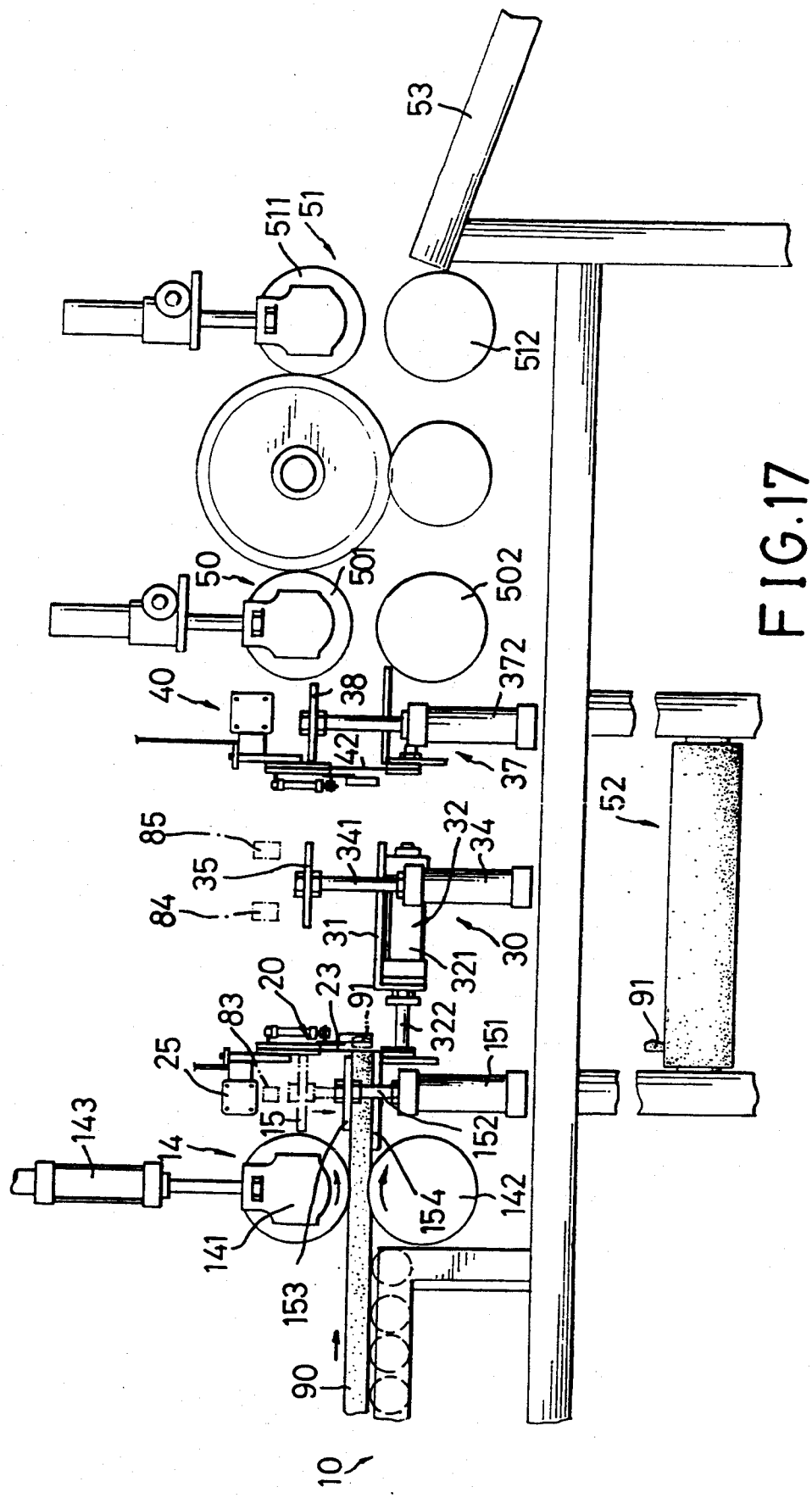
FIGS. 17 through 21 are schematic side views illustrating operation of the machine in accordance with the present invention.

FIGS. 17 through 21 illustrate operation of the machine. Referring to FIG. 17, after being foamed, a raw PE or EVA material plate 90 still has an irregular perimeter and is manually fed into the feeding assembly 10 which transmits it to the first transportation assembly 14. The upper positioning wheel 141 is in its lower position, and the raw material plate 90 is carried rightwards by the lower rotational wheel 142 until the front end thereof passes through the front heating blade 23. Under detection of electric eye 83, the lower rotational wheel 142 stops and the piston rods 152 of cylinders 151 carry the movable plate 153 of the front clamping assembly 15 downwardly to clamp the raw material plate 90. Then, cylinder 25 carries the front heating blade 23 horizontally to cut the front edge of material plate 90, the waste material 91 falls on the waste material conveyor 52 and thus is carried to a waste container.

Figure 18:
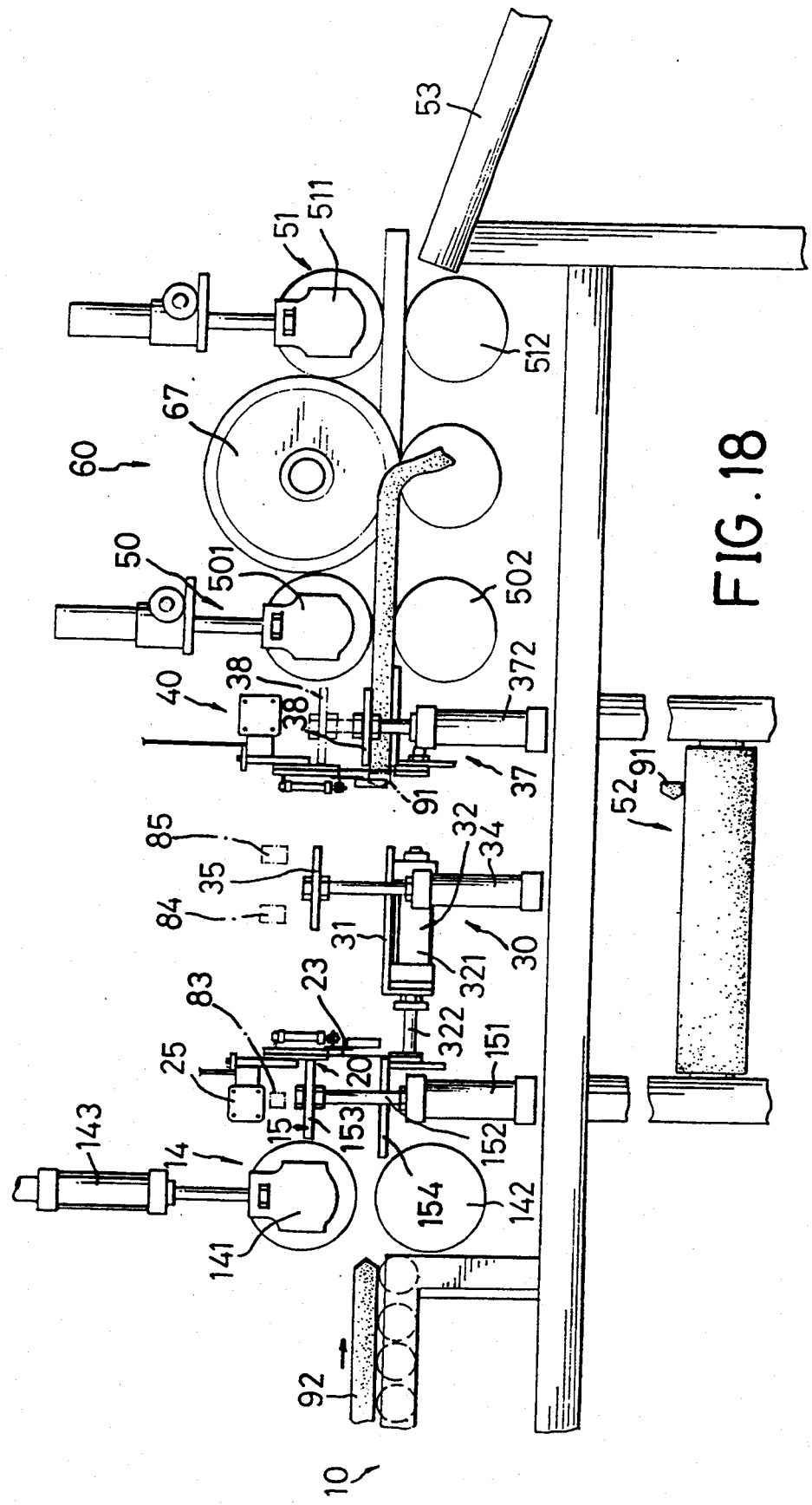

Referring to FIG. 18, thereafter, the lower rotational wheel 142 again moves the raw material plate 90 rightwards during which the sides of the raw material plate 90 are cut by the cutters 67 of the side cutting assembly 60 and the waste material after cutting is dispensed by the guiding member 682 [not shown in this Figure]. When the raw material 90 has passed through electric eye 85 for a pre-determined distance, the lower rotational wheels 502 and 512 and cutters 67 stop simultaneously. Thereafter, the movable plate 38 of the rear clamping assembly 37 moves downwardly to clamp the rear end of the raw material plate 90, and the rear heating blade 42 is actuated to move horizontally to cut the rear end of the raw material plate 90 and during the cutting the front heating blade 23 is returned to its original position.

Figure 19:
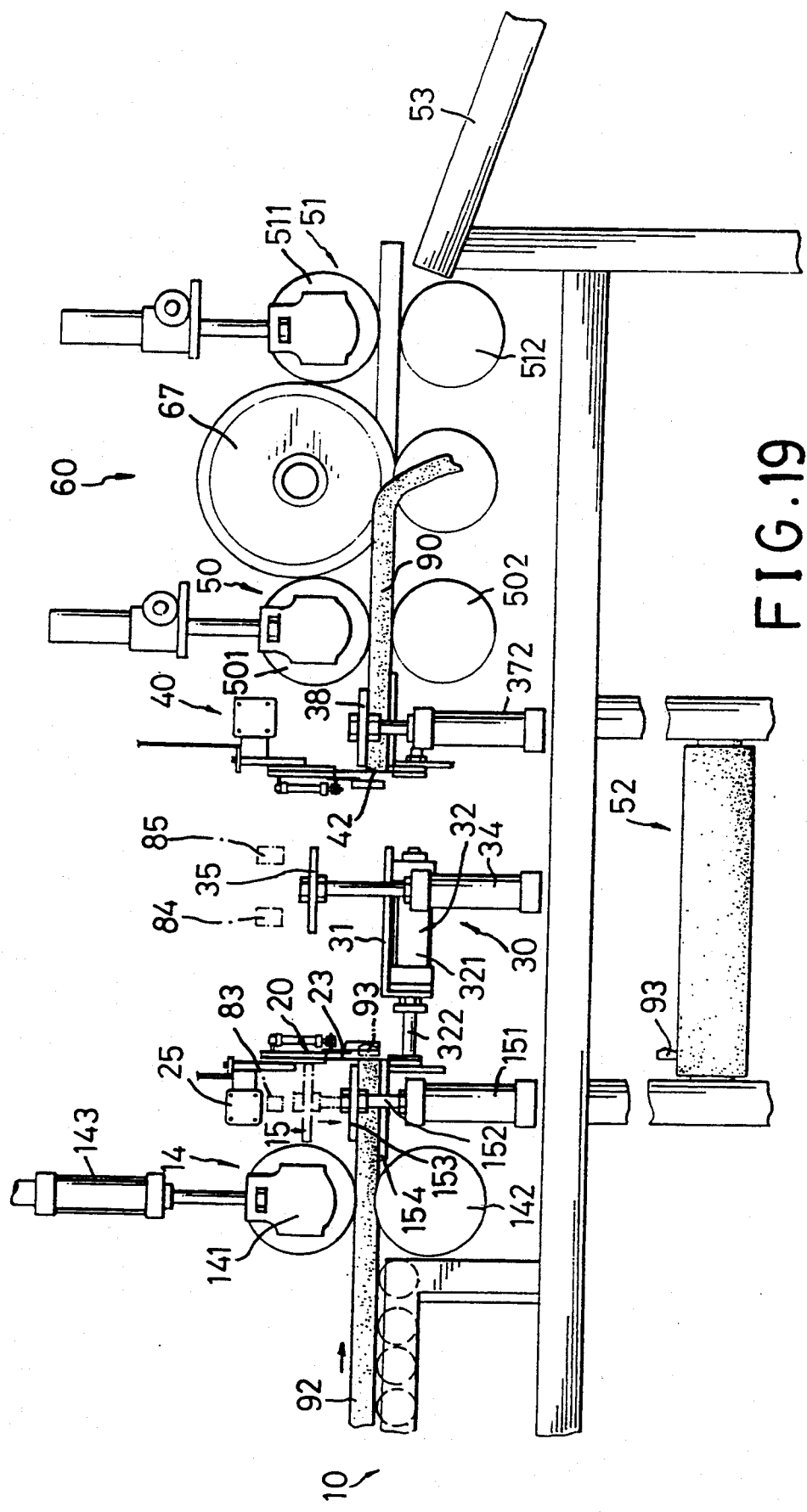

Referring now to FIG. 19, a new raw material plate 92 is fed and its front end is cut by the front heating blade 23, feeding and cutting operations for the raw material plate 92 are identical to that described in the above except that the waste material is now identified by reference numeral "92".

Figure 20:
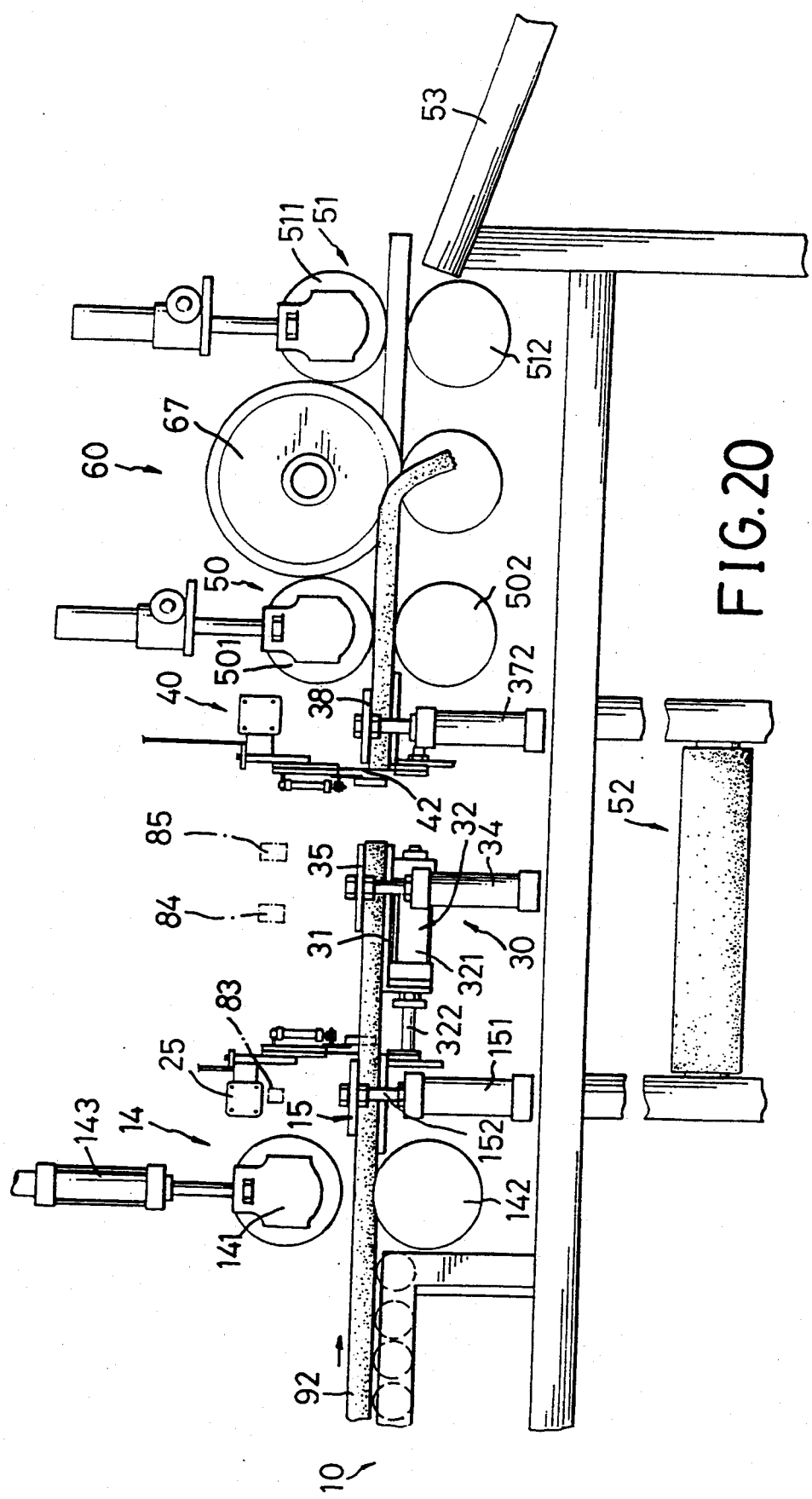

Now turning to FIG. 20, the lower rotational wheel 142 again moves the raw material plate 92 rightwards. The vertical cylinder 34 of the movable table means 30 urges the clamping plate 35 to move downwardly to clamp the front end of the raw material plate 92. Then, the whole movable table means 30 is carried rightwards by horizontal cylinder 32 toward material plate 90 during which the upper positioning wheel 141 is lifted to allow smooth rightward movement of raw material plate 92 until material plates 90 and 92 contact with each other. Thereafter, the rear heating blade 42 passes through the contact surface between the two material plates 90 and 92 to fuse them together by melting. Subsequently, the cutters 67 rotate and then the lower positioning wheels 502 and 512 rotate to cut the sides of material plate 92 during the further rightward movement of the latter for reeling it. The machine can be operated by only one worker who is only required in the feeding procedure.

Figure 21:
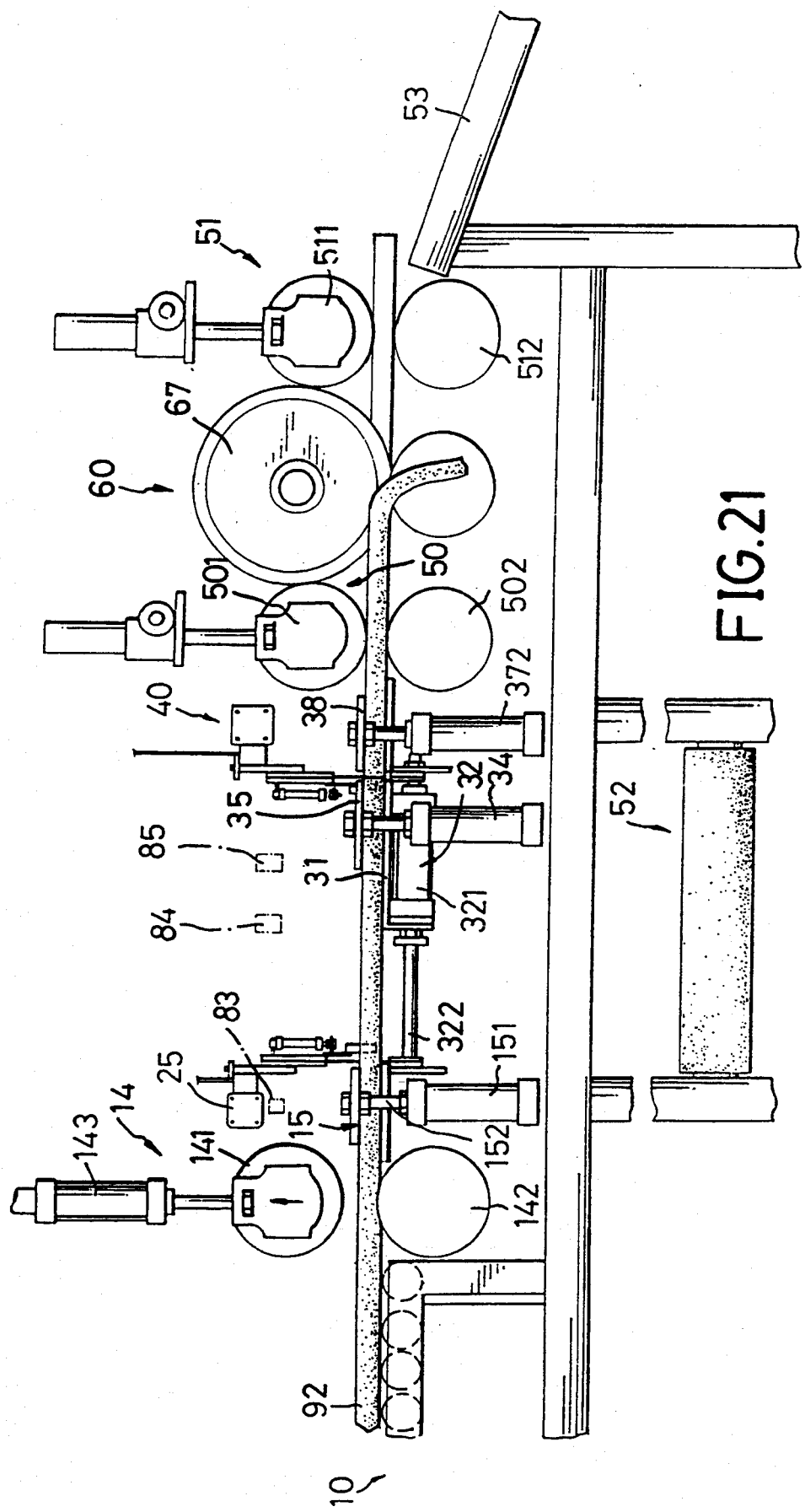

Finally referring to FIG. 21, when material plate 90 is to be reeled to the reel assembly 70, the movable plates 153, 38, and 35 respectively of the front and rear clamping assemblies 15 and 37 and the movable table means 30 simultaneously move upwardly, and under actuation of the lower rotational wheels 142, 502 and 512, one end of material plate 90 engages with the cutouts 711 in the reel 71. With reference to FIG. 15, at this moment, motor 73 rotates front and rear rotational wheels 75 and 751 to further move material plate 90 rightwards and thus rotate the reel 71 to coil the material plate 90 on the reel 71. After a predetermined length of material plate is coiled around the reel 71, the machine is stopped and beam members 723 are moved away from beam members 721 for removal of the reel 71 and to replace it with a blank one. Thereafter, the blank reel 71 is lowered to its lowermost position for subsequent operation.

Although the invention has been explained in relation to its preferred embodiment, it is to be understood that many other possible modifications and variations can be made without departing from the spirit and scope of the invention as hereinafter claimed.

I claim:

1. A machine for cutting, fusing, and reeling raw material plates of plastic material, the machine comprising:

a feeding assembly (10) for feeding raw material plates having irregular front and rear ends and two irregular sides;

a front electric heating assembly (20) for cutting the irregular front end of the raw material plate (92);

a first transportation means (14) for transporting the raw material plate (92) fed by the feeding assembly (10) to the front electric heating assembly (20);

a front clamping assembly (15) for clamping the front end of the raw material plate (92) to be cut;

a rear electric heating assembly (40) for fusing the cut front end of the raw material plate (92) and a rear end of a previously cut material plate (90) together to form a material web and for cutting the irregular rear end of the raw material plate (92);

a second transportation means (50) for transporting the raw material plate (92) from the front electric heating assembly (20) to the rear electric heating assembly (40);

a movable table means (30) provided between the front and rear electric assemblies (20 and 40) and movable along a feeding direction of the material plate (92) for transporting the raw material plate (92) and for clamping the raw material plate (92) during the transportation;

a rear clamping assembly (37) for clamping the rear end of the raw material plate (92) to be cut;

a reel assembly (70) for coiling the material web; and a third transportation assembly (51) for transporting the material web to the reel assembly (70);

wherein the rear electric heating assembly (40) includes a heating blade (42), a cylinder means (41) for effecting horizontal movement of the heating blade (42), a mounting means for securely attaching the heating blade (42) to the cylinder means (41), first, second third, and fourth pulleys (44, 441, 442, and 443) respectively mounted to four corners thereof, a loop (45) starts from the third pulley (442), passes over the fourth pulley (443), tangles around the first and second pulleys (44 and 441) twice, and returns to the first pulley (442), a lower end of the heating blade (42) is attached to the loop (45) a section between the third and fourth pulleys (442 and 443), an upper end of the heating blade (42) is attached to the loop (45) at a second tangling section between pulleys (44 and 441), thereby allowing synchronous horizontal movement of the upper and lower ends of the heating blade (42) under operation of the cylinder means (41).

* * * * *